United States Patent [19]
Cho

[11] Patent Number: 5,854,695
[45] Date of Patent: Dec. 29, 1998

[54] DOCUMENT TRANSMITTING INTERVAL RETAINER FOR A FACSIMILE

[75] Inventor: Young-Bok Cho, Seoul, Rep. of Korea

[73] Assignee: SamSung Electronics Co., Ltd., Suwon, Rep. of Korea

[21] Appl. No.: 679,431

[22] Filed: Jul. 8, 1996

[30] Foreign Application Priority Data

Jul. 8, 1995 [KR] Rep. of Korea .................. 16851/1995

[51] Int. Cl.⁶ ....................................... H04N 1/04
[52] U.S. Cl. .......................... 358/498; 358/474; 358/494; 271/116; 271/121
[58] Field of Search .................. 358/498, 494, 358/424, 296; 271/265, 35, 116, 121, 161, 167, 270, 126, 10.13; 192/69.7, 69.63, 41

[56] References Cited

U.S. PATENT DOCUMENTS

| | | |
|---|---|---|
| 4,566,566 | 1/1986 | Vuillet ........................................ 192/24 |
| 4,667,244 | 5/1987 | Ishikawa . |
| 5,116,038 | 5/1992 | Kim ........................................... 271/10 |
| 5,155,603 | 10/1992 | Jung . |
| 5,169,136 | 12/1992 | Yamagata et al. ......................... 271/10 |
| 5,206,737 | 4/1993 | Sugiyama . |
| 5,314,053 | 5/1994 | Nishimura ................................. 192/41 |
| 5,570,855 | 11/1996 | Aihara ...................................... 242/565 |

*Primary Examiner*—Edward L. Coles
*Assistant Examiner*—Mark Wallerson
*Attorney, Agent, or Firm*—Robert E. Bushnell, Esq.

[57] ABSTRACT

A document transmitting interval retainer for a facsimile which includes a shaft having a step-like portion and having a D-cut side on one end and a groove formed along the circumference on an opposite end of the shaft, an automatic document feeder roller inserted into the shaft, and having a projection on one end, a bushing inserted between the step-like portion and the roller, the bushing having an idling stopper that protrudes in one lateral direction to keep the automatic document feeder roller from idling, and a fixing ring having a pair of hooked catches formed on one side to be inserted into the groove to keep the automatic document feeder roller from being disjoined from the shaft.

7 Claims, 2 Drawing Sheets

5,854,695

DOCUMENT TRANSMITTING INTERVAL RETAINER FOR A FACSIMILE

CROSS-REFERENCE TO RELATED APPLICATIONS

This application makes reference to, incorporates the same herein, and claims all benefits accruing under 35 U.S.C. §119 arising from an application for *Locking Device For Locking A Note Book Computer Onto A Docking Station* earlier filed in the Korean Industrial Property Office on 8 Jul. 1995 and there duly assigned Serial No. 16851/1995.

FIELD OF THE INVENTION

The present invention relates to a document transmitting interval retainer for a facsimile that can control paper feeding in sequence, keeping regular intervals between sheets of document to be transmitted.

BACKGROUND OF THE INVENTION

Document transmitting interval retainers, or main rollers or automatic document feeders are used in facsimile machines to determine the pitch or interval between sheets of paper that are to be transmitted. The transmittal interval retainer often contains a cylindrical shaft part concentrically located within a roller part. The roller must (1) be attached to the shaft, and (2) rotate with the shaft.

Prior art has devised a mechanism to accomplish these two goals. A document transmitting interval retainer has been installed inside a facsimile to keep regular intervals between sheets of document that are continuously fed into a facsimile machine. For example, U.S. Pat. No. 5,155,603 for an *Apparatus for Transferring Documents in a Facsimile* to S. Jung discloses a conventional roller showing a pin radially inserted into a pinhole of the shaft to serve as a catch to allow a roller to rotate with the shaft when said shaft is rotated. A protrusion from the roller extending axially makes contact with the pin, causing the outer roller to rotate with said shaft.

With the use of small parts such as a pin or an E-ring, there is an increased chance that the parts may become lost or detached, causing critical deterioration of the device.

SUMMARY OF THE INVENTION

It is therefore an object to present a document feed roller for a facsimile machine that does not rely on the use of small parts that can easily become lost or detached.

It is also an object to provide a document feed mechanism that can connect the roller to the shaft without the use of small, easy to lose, parts.

It is still another object to provide a document feed apparatus where there is a low risk of the parts becoming lost or detached, thus preventing the deterioration thereof.

It yet another object to provide a document feed mechanism for a facsimile machine that allows the roller to become engaged and rotate with the shaft without the use of small, easy to lose, parts.

It is also an object to present a document transmitting interval retainer for a facsimile that is easily installed in a facsimile to prevent deterioration due to detachment of components thereof.

In order to achieve the above object, the inventive document transmitting interval retainer for a facsimile contains a shaft including a step-like portion having a D-cut side and a groove formed along the circumference on the other side of the shaft an automatic document feeder automatic document feeder roller into the shaft to have a first projection on one side end and feed sheets of document to be transmitted, a bushing is inserted through the step-like portion and has an idling stopping means that protrudes on one side end in one lateral direction to keep the roller automatic document feeder from idling, and a fixing ring having a pair of hooked catches formed on one side to be inserted into the groove to keep the roller automatic document feeder from being disjoined from the shaft.

As the bushing is inserted through the step-like portion of the shaft, the roller automatic document feeder is inserted therethrough, and the fixing ring is finally fit thereinto to allow the first projection of the roller automatic document feeder to get caught by the idling stopping means of the bushing to keep the roller automatic document feeder from idling.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
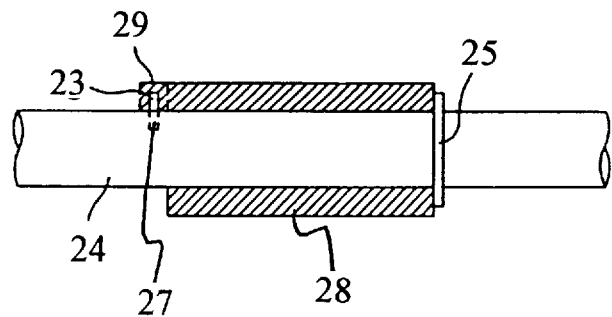
FIG. 1 is a cross section of an assembled main roller or a conventional document transmit system for a facsimile.
Figure 2:
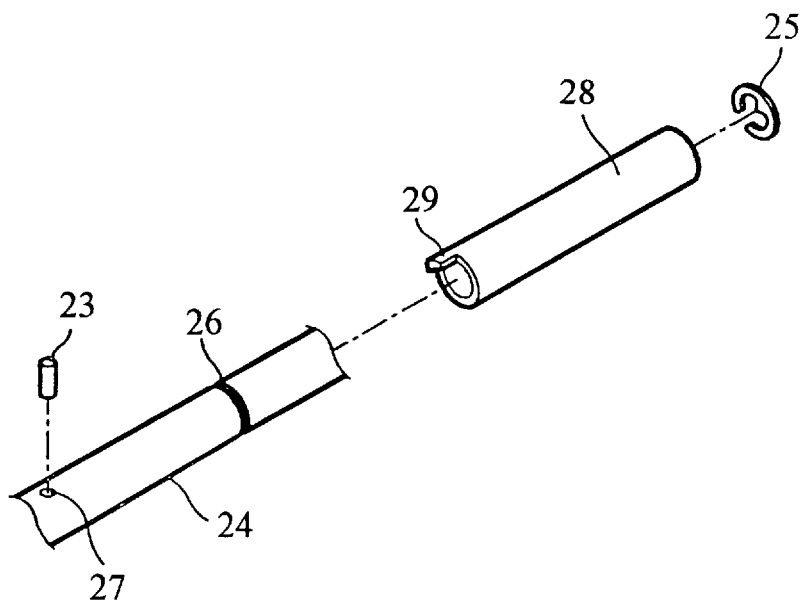
FIG. 2 is an exploded perspective view of the unassembled document transmit system shown in FIG. 1.

As shown in FIGS. 1 and 2, an earlier transmitting interval retainer for a facsimile is comprised of shaft 24 including fixing groove 26 on one side on which E-ring 25 is mounted, and pin hole 27 into which pin 23 is fixed on the other side, paper feeding roller 28 inserted into shaft 24 and having fixing projection 29 that protrudes laterally on one side end and serves as a stopper during the rotation.

In the earlier structure, E-ring 25 is fit onto fixing groove 26 while shaft 24 has pinhole 27 into which pin 23 is fixed. When these parts are missing or detached therefrom in the field, critical deterioration such as shot or something may occur in the parts of the set. Besides, the use of jig in the production process causes a rise in the production cost.

Figure 3:
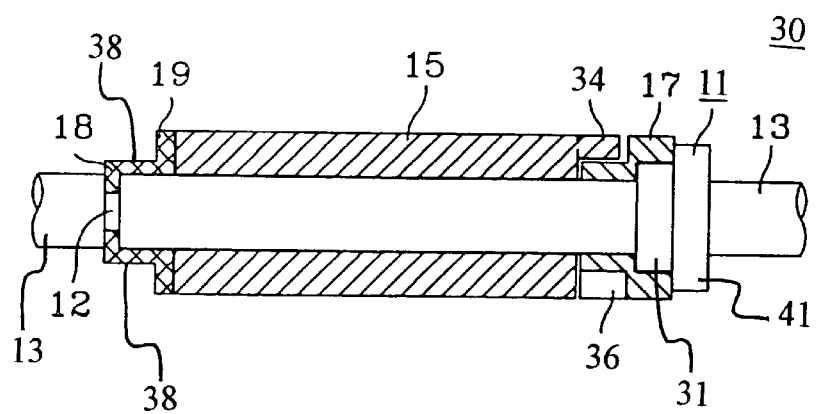
FIG. 3 is a cross section of a main roller assembled to a shaft according to the present invention.
Figure 4:
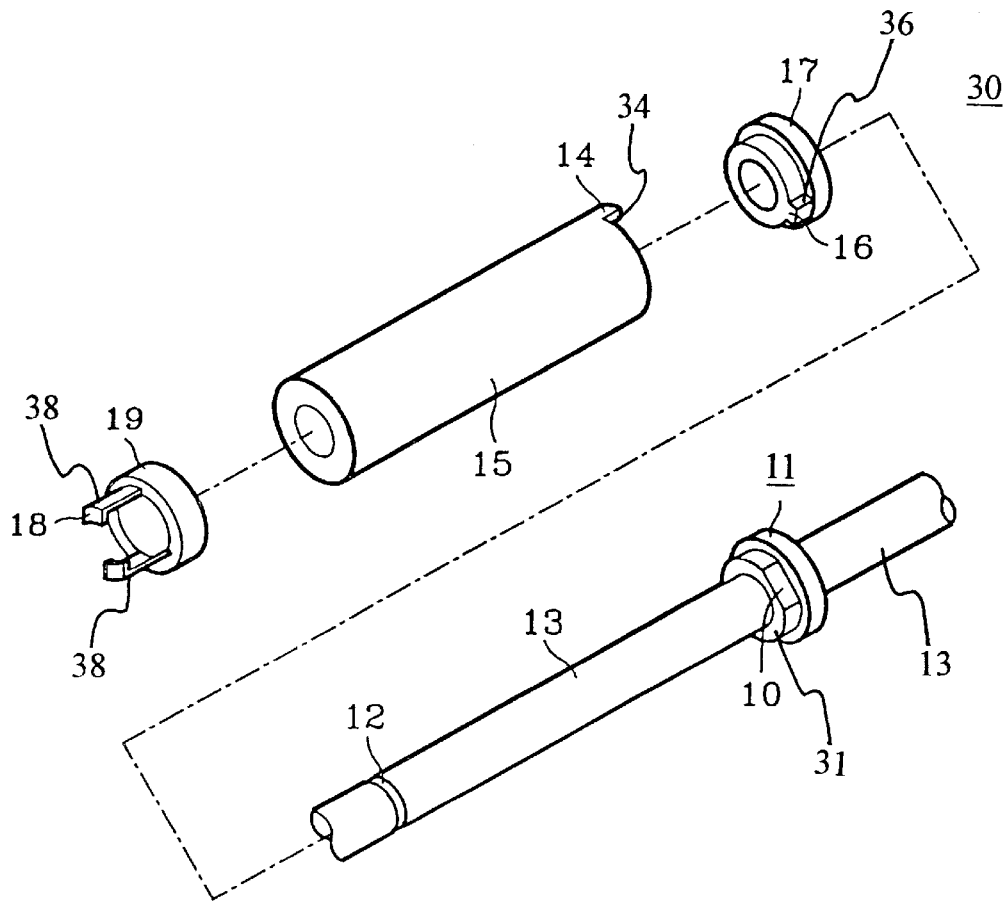
FIG. 4 is an exploded perspective view of the unassembled document transmit system shown in FIG. 3.

Preferred embodiments of the present invention will now be discussed in detail with reference to the accompanying drawings. As shown in FIGS. 3 and 4, document transmitting interval-retainer 30 for a facsimile of the present invention is comprised of shaft 13, including step-like portion 11, with an inner step 31 and an outer step 41, inner step 31 having a having D-cut side 10 and groove 12 formed along the circumference on the other side of shaft 13, automatic document feeder roller 15 through which shaft 13 is inserted into. First projection 14 on one side end of roller 15 and feed sheets of document to be transmitted, a bushing 17 that is inserted through step-like portion 11 and have idling-stopper 16 that protrudes on one side end in one lateral direction to keep roller automatic document feeder 15 from idling, and fixing ring 19 that has pair of arms 38 ending with a pair of hooked catches 18 formed on one side to be inserted into groove 12 to keep roller automatic document feeder 15 from being disjoined from shaft 13. These hooked catches 18 are elastic and have tensive force biased to securing fixing ring 19 onto groove 12 of shaft 13. Roller automatic document feeder 15 may be integrally formed with the fixing ring 19.

In the inventive device, bushing 17 is fit into step-like portion 11 having D-cut surface 10 so that contacting face 36 of idling-stopper 16 will face toward the inside, and roller automatic document feeder 15 is inserted through shaft 13 to allow contact face 34 of first projection 14 to face in the direction of insertion. Inserting the fixing ring into shaft 13 makes hooked catches 18 fit into groove 12 to complete the assembling step. As the transmission driving starts off, shaft 13 turns to rotate roller automatic document feeder 15. First projection 14 of the roller automatic document feeder 15 gets caught by idling-stopper 16 of bushing 17 to keep roller automatic document feeder 15 from idling. This occurs as contact face 34 of first projection 14 of roller 15 makes contact with contact face 36 of bushing 17 on shaft 13.

Since the inventive device can be put together just by sequentially inserting each part to shaft 13 in the correct direction without an E-ring, pin or jig, we may have advantages of simple assembling process, prevention of poor assemblage due to missing parts, and curtailment in the production cost.

The preferred embodiment of the present invention is given by way of example, and the invention recited in the attached claims is not limited to the illustrative embodiment. Those of ordinary skill in the art will recognize that routine design changes may be made to the exemplary embodiments without departing from the scope of the claims.

What is claimed is:

1. A document transmitting interval retainer for a facsimile comprising:
    a shaft including a step-like portion on one end and a groove formed along the circumference on an opposite end of the shaft;
    a document feeding roller rotatably mounted on said shaft, said document feeding roller having a projection on one end;
    a bushing in which the step-like portion is inserted, said bushing having an idling stopping means that protrudes in one lateral direction for contacting said projection to keep the document feeding roller from idling when said shaft is rotated; and
    a fixing ring having a pair of hooked catches formed on one side to be inserted into the groove to keep the document feeding roller from being disjoined from the shaft.

2. The document transmitting interval retainer as set forth in claim 1, wherein said pair of hooked catches are oppositely disposed respective to each other.

3. The document transmitting interval retainer as set forth in claim 2, wherein said hooked catches have a tension.

4. A document feeding apparatus, comprising:
    a hollow cylindrical roller having a first and a second end, said second end containing a protrusion extending parallel to an axis of said roller;
    a cylindrical shaft having a first end and a second end having a stepped portion, said cylindrical shaft being inserted through said hollow cylindrical roller so as to be concentric with said hollow cylindrical roller, said first end of said cylindrical shaft having a groove extending around the circumference;
    a bushing placed over said stepped portion of said second end of said shaft, said bushing containing an idling stopper that engages with said protrusion on said second end of said hollow cylindrical roller when said shaft is rotated, causing said roller to rotate with said shaft; and
    a fixing ring mounted on said cylindrical shaft for keeping said hollow cylindrical roller from being disjoined from said cylindrical shaft.

5. The document feeding apparatus of claim 4, said fixing ring comprising a pair of elastic hooked catches protruding axially from one side of said fixing ring, said hooked catches being positioned in said groove on said shaft for preventing said roller from moving axially with respect to said shaft.

6. The document transmitting interval retainer of claim 1, said step like portion comprising an inner step and an outer step, the inner step having a D-cut side.

7. The document feeding apparatus of claim 4, said stepped portion comprising an inner step and an outer step, the inner step having a D-cut side.

* * * * *